Patented Mar. 3, 1936

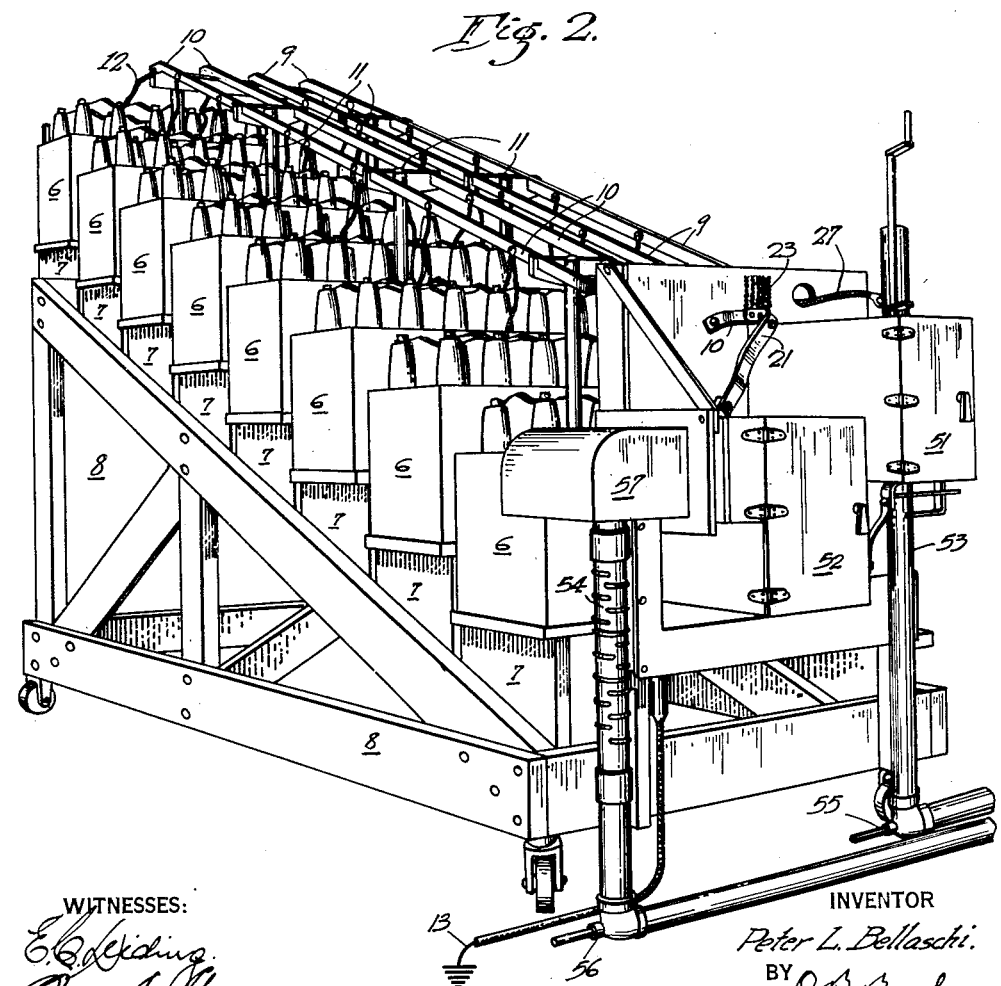

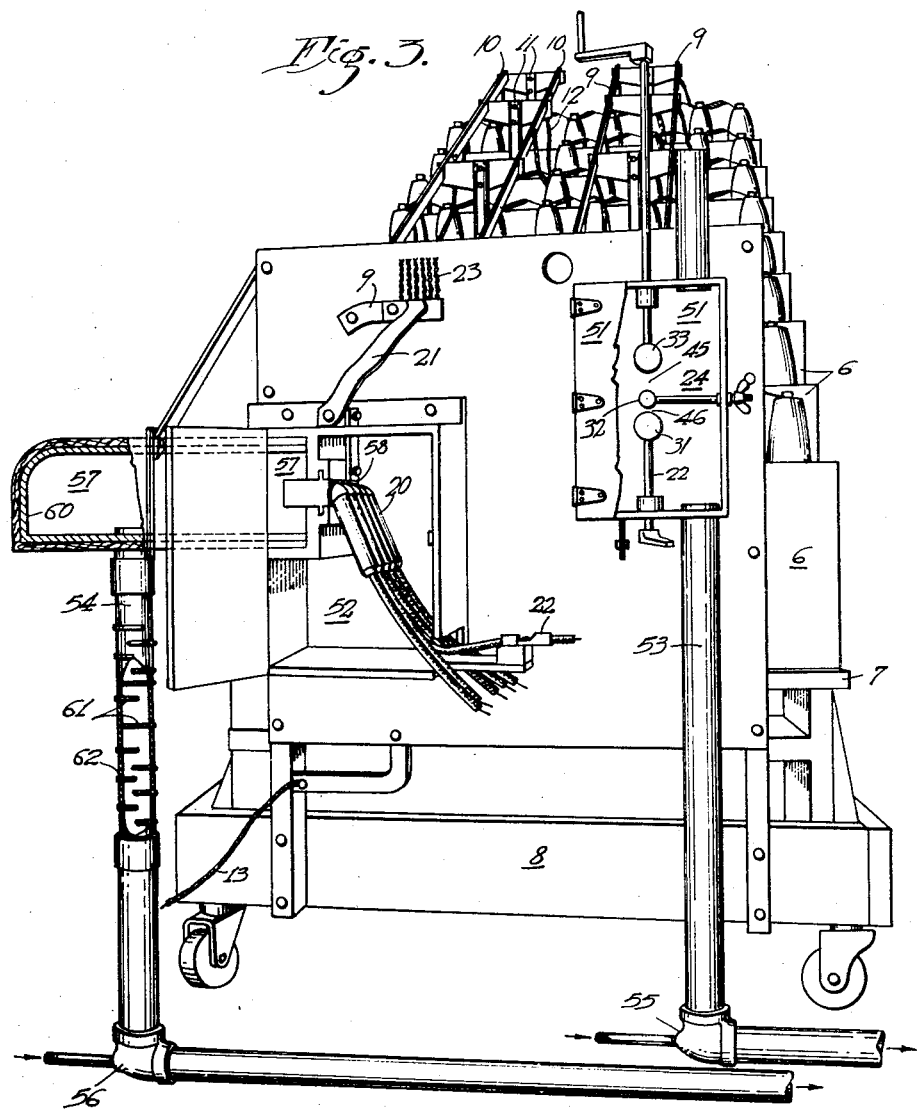

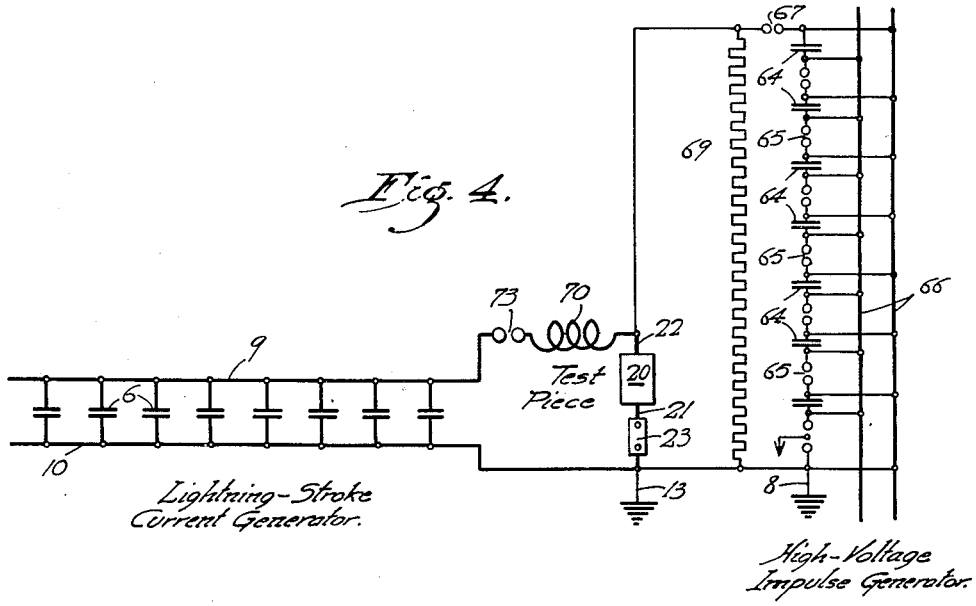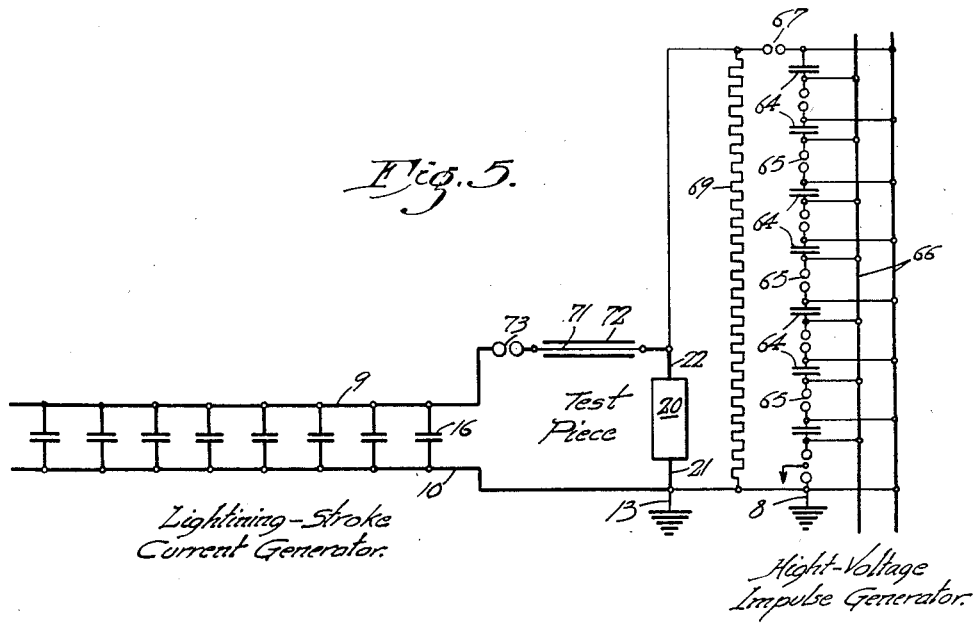

2,032,904

UNITED STATES PATENT OFFICE 2,032,904

LIGHTNING-STROKE GENERATOR

Peter L. Bellaschi, Sharon, Pa., assignor to Westinghouse Electric & Manufacturing Company, East Pittsburgh, Pa., a corporation of Pennsylvania Application October 3, 1935, Serial No. 43,355

18 Claims. (Cl. 175—183)

My present invention relates to lightning-stroke current generators and to combined lightning-stroke current and voltage generators, such as are described in my paper in Electrical Engineering, published by the American Institute of Electrical Engineers, for January, 1934, volume 53, pages 86 to 94, and in my article in the Electric Journal for June, 1935, volume 32, pages 237 to 240.

Prior to my present invention, so-called lightning generators, which were utilized for testing insulators and the like, were high-voltage impulse-generators which were capable of generating a very high voltage with relatively little current. It has long been obvious, however, that such an impulse-generator could not begin to duplicate the enormous destructive effects of an actual lightning-current discharge, which I believe often reaches a magnitude of the order of 100,000 amperes crest-value, or even 150,000 or 200,000 amperes, with a duration of from 40 to 100 or even 200 microseconds to half value.

In order to make it possible to test protective equipment which is designed to handle direct lightning-strokes, it has been necessary for me to design a lightning-stroke generator which would duplicate the destructive forces of the heavy lightning currents. Since the initial publication of my work, others have attempted to build similar generators, and have displayed a tendency to strive for large currents, which are obtained by reducing the impedance of the circuit to an extreme minimum, but without obtaining a sufficient duration of discharge to really simulate lightning-stroke conditions. I have found, in my work, that the inductance of the circuit must not be reduced to its lowest possible value, but must be sufficiently large to make it possible or practicable to obtain a sufficiently long duration of discharge.

An object of my invention is to provide a lightning-stroke current generator of the type just indicated.

A further object of my invention is to so combine a lightning-stroke current generator and a high-voltage impulse generator, that the combined apparatus will simultaneously produce a sufficiently high voltage and a sufficiently heavy current-discharge to simulate the full effect of a very severe, direct lightning-stroke discharge occurring in nature. Thus, the impulse generator may first discharge through or across the test piece, without being short-circuited by the low-impedance lightning-current generator, and the current generator may thereafter discharge its heavy current through the test piece. The use of the surge impulse generator to initiate the discharge renders the operation of the lightning-current generator totally independent of the voltage required to initiate the discharge in the test piece, which is useful even in testing low-voltage devices.

In developing the lightning-stroke generator adapted for the routine testing of insulation and protective equipment, it has been necessary to provide, as a practical feature of the device, some means for muffling and silencing the deafening and harmful thunderous discharge, so as to make it possible for the operator to remain near by, in order to control the equipment and to make rapid connections of successive test pieces. To this end, I procured and tried mufflers such as are made for machine guns, but without success. I also tried silencers but without any better results. In order successfully to clap a hand over the mouth of thunder, as it were, it was necessary for me to develop a special muffler and a special baffle arrangement.

An object of my invention is to provide such a muffler and baffling means.

With the foregoing outstanding objects in view, and many others which will be understood from the following specification, my invention consists in the apparatus, systems, combinations and methods hereinafter described and claimed, and illustrated in the accompanying drawings, wherein:

Figure 1 is a diagrammatic view embodying a simplified wiring diagram illustrative of my lightning-stroke current generator and its manner of use, Fig. 2 is a three-quarter perspective view of a preferred embodiment of my current generator, Fig. 3 is a front perspective view thereof, with parts broken away to show the internal construction, Fig. 4 is a diagrammatic view comprising a simplified wiring diagram for my combined lightning-stroke current and voltage generator, and Fig. 5 is a similar view showing a slight modification of the equipment shown in Fig. 4.

The particular lightning-stroke current generator shown in Figs. 2 and 3 consists essentially of sixty-four or any large number of capacitors 6 banked together, each rated at 100,000 volts and 0.25 microfarad capacitance. Each capacitor may conveniently consist of two 50,000-volt or higher voltage capacitors connected in series, and both mounted in the same tank, or mounted in separate tanks directly connected together so as to electrically constitute a single unit. It is desirable that the voltage of the capacitors should be as high as possible, if the equipment is to be utilized for testing a wide variety of test pieces of different voltage-ratings, so that the lightning-stroke current generator may be capable of breaking down the insulation of the test piece. Where my invention is utilized in conjunction with an impulse generator, however, as shown in Figs. 4 and 5, a high-voltage capacitor bank is not necessary, particularly where oscillatory discharges are utilized (with minimum resistance), in which case capacitor voltages of 10,000 to 50,000 volts, or even lower voltages, may be used.

As shown in Figs. 2 and 3, my sixty-four capacitors 6 are mounted in groups of eight on each of eight steps 7 of a wooden rack 8. I provide buses 9 and 10 for connecting the sixty-four capacitors 6 all in parallel, and each of the buses 9 and 10 preferably comprises two large copper bars connected in parallel, in order to reduce the resistance-losses to a minimum, and to properly adjust the effect of the inductance in relation to the capacitance, so that the current delivered by the generator will simulate an actual lightning-current discharge, both in amplitude and in duration, as previously mentioned. The buses 9 and 10 are rigidly supported on insulating uprights 11, and are connected to the capacitors by means of flexible straps or cables 12 so as to avoid mechanical stresses due to the passage of the extremely heavy currents and thermal expansion and contraction. The bus 10 is grounded as indicated at 13.

Reference to Fig. 1 will show that the capacitors 6 are all permanently connected in parallel between the buses 9 and 10, and are all charged at once by means of a charging unit consisting of a step-up transformer 14, two rectifiers 15, electrical storage devices in the form of capacitors 16, and a current-limiting charging-resistance 17. In Fig. 1, only eight capacitors 6 are shown, for simplicity of illustration, although it will be understood that the figure represents all of the capacitors.

In operation, the charging unit charges the entire bank of capacitors slowly, that is, at a rate which is very slow in comparison with the duration of the discharge, requiring a charging period of something like one minute in order to charge the capacitors 6 to substantially their full value. It will be noted that the charging unit delivers a rectified current at a voltage equal to the capacitor voltage appearing across the buses 9 and 10.

In Fig. 1, the test piece is indicated at 20, the same being connected between terminal connections 21 and 22 of the generator. The terminal connection 21 for the test piece is connected to the generator bus 10 through a specially constructed low-resistance current-shunt 23 having the smallest possible inductance. The other terminal connection 22 for the test piece is connected to the other bus 9 of the generator through a triple-gap device 24, and also, if desired for the purpose of controlling the wave-form of the current-output, through a small series resistor 27.

The gap-device 24 is utilized for the purpose of effecting an electrical connection between the lightning-stroke current generator and the test piece, so as to initiate the discharge. The gap-device 24 consists of three spaced gap-electrodes 31, 32 and 33, the two end electrodes 31 and 33 being connected, respectively, to the test-piece terminal connection 22 and to the series resistor 27, or directly to the generator bus 9 if the series resistor 27 is not utilized. The intermediate gap-electrode 32 is usually connected to some sort of tripping and synchronizing circuit whereby the exact moment of discharge may be mechanically or electrically synchronized with respect to the commercial supply-circuit, usually 60 cycles, so that the discharge occurs at or near the crest of the power-frequency voltage, or at any other desired point in the wave.

A simplified tripping and synchronizing circuit for this purpose is indicated in Fig. 1 as comprising a push button 36 which is utilized to energize a step-up transformer 37 which is connected to the middle electrode 38 of a second triple-gap device 40, the two terminal electrodes 41 and 42 of which are connected to the other terminal of the step-up transformer 37 through a resistor 43 and a capacitor 44, respectively, so that the triple-gap device 40 breaks down at or near the crest of the power-frequency voltage. The terminal electrode 41 of the gap-device 40 is connected to the intermediate gap-electrode 32 of the main triple-gap device 24, the connections being such that the intermediate gap-electrode 32 is thus given a potential which is opposite to the potential of the ungrounded electrode 33 of the main gap-device 24, so that the upper gap 45 of the triple-gap device 24 first breaks down, after which the full voltage of the lightning-stroke current generator is applied to the lower gap 46, breaking down the latter and causing the current generator to discharge through the test piece 20.

If desired, the discharge-current may be measured or recorded by means of a cathode-ray oscillograph 48 which is diagrammatically indicated in Fig. 1, and which is connected across the current-shunt 23 by means of a wire or wires which are enclosed in a grounded sheathed cable 49.

To look at a flashover across the gap device of a low-current lightning-voltage or impulse generator would not be anything like as dangerous as looking at the intolerably bright arc of a full lightning-current discharge. To look directly at a stroke of lightning from the relatively short distance across a laboratory would probably mean permanent injury to the eyes. In order to partially protect the eyes of the operators, as well as to provide means for carrying away the noxious gases of the discharge and to keep the air in a normal condition at the discharge point, as well as to safeguard against the flying particles of a test piece which may become disrupted by the discharge, the various discharge devices are enclosed in boxes or housings as indicated in Figs. 2 and 3, wherein is shown a triple-gap housing 51 in which the triple-gap device 24 is located, and a test chamber 52 in which the test piece 20 is located, both of these boxes 51 and 52 being ventilated by means of exhaust pipes 53 and 54, respectively, through which air is sucked by means of injector pumps 55 and 56, respectively.

As previously intimated, the clap of thunder of the lightning-current discharge must be silenced or muffled, and the apparatus which I have designed to accomplish this purpose is shown in Figs. 2 and 3 as comprising a muffler 57 mounted partly within and partly without the test chamber 52, and having connections 58, at the end which is located within the test chamber, for receiving a plurality of test pieces 20, such as tubular lightning arresters of the exhaust-blast type, which discharge into the muffler 57. The muffler is provided with a thick lining of sound-deadening material, such as a one-fourth inch lining 60 of lead.

The muffler 57 is connected to the exhaust pipe 54, so that it is really the muffler which is ventilated, rather than the test chamber, strictly speaking. The sound-deadening action of the muffler must be aided by means of a plurality of opposed, spaced baffles 61, which are disposed within the exhaust or vent pipe 54, preferably by means of saw cuts 62, each about half-way through the vent pipe 54, at a plurality of spaced points along the vent pipe, successive saw cuts being made from different sides of the pipe, and the saw cuts being thereafter filled with the baffles 61 which consist of semi-circular plates which are welded in place, as indicated.

In the design of a lightning-stroke current generator in accordance with my invention, particularly where the highest oscillatory discharges are to be made possible with the apparatus, the proportional arrangements should be observed whereby the effective inductance of the buses, gap-means and terminal connections, in microhenries, is at least of the order of 100 times the effective series discharge-resistance, in ohms, of the lightning-stroke current generator with its terminal connections 21 and 22 joined through a very low resistance in lieu of a test-piece, or at least 20 times the combined effective series discharge-resistance, in ohms, of the test piece and the lightning-stroke current generator. Numerically, the value of the inductance L may be at least of the order of 4 microhenries; or the inductance, in microhenries, may be at least of the order of ¼ of the effective capacitance C of the entire capacitor-bank, in microfarads. By this means, a current-discharge of adequate duration (40 to 200 microseconds to half value) is attained, particularly when the series resistor 27 is omitted in order to obtain oscillatory discharges of the maximum intensity.

The voltage of the capacitor-bank is not an absolute prerequisite, particularly when my current generator is utilized in conjunction with a voltage generator, as will be subsequently described in connection with Figs. 4 and 5, but it is believed to be desirable that the capacitor-voltage of the current generator should be at least of the order of 10,000 to 50,000 volts and preferably from 100,000 to 300,000 volts.

If the total series discharge-resistance is raised to a sufficiently high value, theoretically $$2\sqrt{L/C}$$

or even higher, as by inserting the series resistor 27, or by utilizing a test piece 20 of sufficiently high discharge-resistance, the discharge will be exponential or non-oscillatory. It is necessary, in this case, for the capacitor-voltage to be sufficiently high to deliver the desired heavy discharge-current through the resistance of the discharge-circuit. It is also necessary for the total capacitance C to be sufficient to deliver the high discharge-current and to produce a sufficient duration of the discharge, which should usually be at least 40 microseconds to half-value, or not much less than that, if actual lightning conditions are to be simulated.

The use of a current-generator which is capable of delivering oscillatory discharges of maximum duration as well as amplitude, with a test-piece of low discharge-resistance, but having such constants that it will also deliver a lightning-simulating non-oscillatory discharge through a test-piece of much higher resistance, makes possible a wide variety of tests with the same apparatus. By inserting an external resistor 27 of the proper value, it is possible to control the amplitude and the wave-form of both the oscillatory discharge and the non-oscillatory discharge. The amplitude can also be controlled by varying the time allowed for the charging of the capacitors 6.

In Fig. 4, I have shown my lightning-stroke current generator combined with a high-voltage impulse-generator which is indicated schematically as consisting essentially of a large number of capacitors 64 which are connected in series by means of spark-gap devices 65, so that the capacitors may be charged, in parallel, from a common charging circuit 66, and may be discharged, in series, through a discharge-gap device 67 which connects onto the terminal connection 22 of the test piece 20, shunted by a high resistance 69.

It is necessary to prevent the voltage generator from discharging altogether through the low-impedance circuit of the current generator. To this end, an impedance-device 70 is employed, connected in series with the bus 9 of the current generator, between said bus and the terminal connection 22 of the test piece 20.

In the embodiment of my invention shown in Fig. 4, this impedance-device 70 is in the form of a coil of adequate inductance, such as 100 microhenries in the particular embodiment of my invention shown in the drawings. In this way, it has been possible to break down a twenty-five-inch gap in the test piece 20, and to discharge, across said gap, approximately 50,000 amperes of a duration in excess of 100 microseconds to half value.

In the embodiment of my invention shown in Fig. 5, the impedance-device 70 takes the more effective form of a high-resistance fuse-link 71, several feet long, which may be enclosed in an insulating tube or housing 72 which may be made of fibre or other equivalent insulating and mechanically adequate material. This high-resistance fuse-link may have an initial resistance of the order of one to a few hundred ohms which keeps enough of the impulse-voltage discharge out of the current generator to produce a voltage sufficient to break down the insulation of the test piece 20. In a matter of one or a few microseconds, the fuse 71 converts itself into a low-resistance arc, so that the discharge of the current generator follows immediately after the high-voltage discharge through or across the test piece 20.

In both Figs. 4 and 5, a gap-device 73 is connected in series with the impedance 70 or 71, between the test-piece terminal 22 and the current-generator bus 9. It will be readily understood that this gap breaks down when a very small part of the high-voltage discharge goes through the impedance 70 or 71, thereby permitting the current-generator discharge to flow through the test piece 20 after the voltage generator has broken down the insulation of said test piece.

By my novel arrangement and combination of a lightning-stroke current generator and a lightning-stroke voltage generator, as shown in Figs. 4 and 5, I have provided a means for testing apparatus (or test pieces) requiring a higher voltage than that which is available from the current generator alone, by initiating the discharge across the apparatus with a high-voltage surge-generator, instantly following with the discharge of the lightning-stroke current generator through the apparatus tested. This combination of current and voltage generator also makes it feasible to design the current generator with a lower voltage on the capacitors 6, thereby eliminating the restrictions imposed on the design of the current generator by the voltage requirements, thus saving very materially in the cost and size of the apparatus, or making it possible to design the apparatus to have a larger current output for a given volume of capacitor material.

While I have illustrated my invention in several forms of embodiment which are at present preferred, and while I have given some indication of magnitude-limits to illustrate my present thoughts in regard to the invention, I desire it to be distinctly understood that such illustration and such limitations may be subject to some variation in the designing of other embodiments of lightning-stroke current generators and combined lightning-stroke current and voltage generators, without departing from the essential scope and spirit of my invention. I desire, therefore, that the appended claims shall be accorded the broadest construction consistent with their language and the prior art.

I claim as my invention:

1. A lightning-stroke current generator comprising a plurality of capacitors, buses connecting said capacitors in parallel, terminal connections for a test piece, and gap-means for controlling the connection of said terminal connections to said buses, characterized by a proportional arrangement whereby the effective inductance of said buses, gap-means and terminal connections, in microhenries, is at least of the order of 100 times the effective series discharge-resistance, in ohms, of the lightning-stroke current generator with its terminal connections joined through a very low resistance.

2. A lightning-stroke current generator comprising a plurality of capacitors, buses connecting said capacitors in parallel, terminal connections for a test piece, and gap-means for controlling the connection of said terminal connections to said buses, characterized by sufficient capacitors to give a maximum crest value of discharge, under optimum conditions, at least of the order of 50,000 amperes, and further characterized by a proportional arrangement whereby the effective inductance of said buses, gap-means and terminal connections, in microhenries, is at least of the order of 20 times the combined effective series discharge-resistance, in ohms, of the test piece and the lightning-stroke current generator.

3. A lightning-stroke current generator comprising a plurality of capacitors, buses connecting said capacitors in parallel, terminal connections for a test piece, gap-means for controlling the connection of said terminal connections to said buses, and means connected across said buses for unidirectionally charging said capacitors, said charging means having the full capacitor-voltage of said buses, characterized by a proportional arrangement whereby the effective inductance of said buses, gap-means and terminal connections, in microhenries, is at least of the order of 100 times the effective series discharge-resistance, in ohms, of the lightning-stroke current generator with its terminal connections joined through a very low resistance.

4. A lightning-stroke current generator comprising a plurality of capacitors each having a rating at least of the order of 50,000 volts, buses connecting said capacitors in parallel, terminal connections for a test piece, gap-means for controlling the connection of said terminal connections to said buses, and means connected across said buses for unidirectionally charging said capacitors, said charging means having the full capacitor-voltage of said buses, characterized by sufficient capacitors to give a maximum crest-value of discharge, under optimum conditions, at least of the order of 100,000 amperes, and further characterized by a proportional arrangement whereby the effective inductance of said buses, gap-means and terminal connections, in microhenries, is at least of the order of 20 times the combined effective series discharge-resistance, in ohms, of the test piece and the lightning-stroke current generator.

5. A lightning-stroke current generator comprising a plurality of capacitors, buses connecting said capacitors in parallel, terminal connections for a test piece, gap-means for controlling the connection of said terminal connections to said buses, and means connected across said buses for unidirectionally charging said capacitors, said charging means having the full capacitor-voltage of said buses, characterized by a proportional arrangement whereby the effective inductance of said buses, gap-means and terminal connections is at least of the order of 4 microhenries.

6. A lightning-stroke current generator comprising a plurality of capacitors, buses connecting said capacitors in parallel, terminal connections for a test piece, gap-means for controlling the connection of said terminal connections to said buses, and means connected across said buses for unidirectionally charging said capacitors, said charging means having the full capacitor-voltage of said buses, characterized by sufficient capacitors and a sufficient preponderance of inductance over resistance to produce an oscillatory-current discharge of amplitude and duration corresponding in effect to that of lightning in nature.

7. A lightning-stroke current generator comprising a plurality of capacitors, buses connecting said capacitors in parallel, terminal connections for a test piece, gap-means for controlling the connection of said terminal connections to said buses, and means connected across said buses for unidirectionally charging said capacitors, said charging means having the full capacitor-voltage of said buses, characterized by a sufficiently high capacitor-voltage and sufficient capacitors such that, when the total series discharge-resistance is high enough to produce a substantially non-oscillatory discharge, the amplitude and duration of the discharge correspond in effect to the effect of lightning in nature.

8. A lightning-stroke current generator comprising a plurality of capacitors, buses connecting said capacitors in parallel, terminal connections for a test piece, gap-means for controlling the connection of said terminal connections to said buses, and means connected across said buses for unidirectionally charging said capacitors, said charging means having the full capacitor-voltage of said buses, characterized by a proportional arrangement whereby the effective inductance of said buses, gap-means and terminal connections, in microhenries, is at least of the order of one quarter of the effective capacitance of the capacitors, in microfarads.

9. A lightning-stroke current generator comprising a plurality of capacitors, buses connecting said capacitors in parallel, terminal connections for a test piece, gap-means for controlling the connection of said terminal connections to said buses, and means connected across said buses for unidirectionally charging said capacitors, said charging means having the full capacitor-voltage of said buses, characterized by a proportional arrangement whereby there is produced, under optimum conditions, a maximum duration of the discharge, to half value, at least of the order of 40 microseconds.

10. A lightning-stroke current generator comprising a plurality of capacitors each having a rating at least of the order of 50,000 volts, buses connecting said capacitors in parallel, terminal connections for a test piece, gap-means for controlling the connection of said terminal connections to said buses, and means connected across said buses for unidirectionally charging said capacitors, said charging means having the full capacitor-voltage of said buses, characterized by a proportional arrangement whereby there is produced, under optimum conditions, a maximum duration of the discharge, to half value, at least of the order of 40 microseconds.

11. A lightning-stroke current generator comprising a plurality of capacitors, buses connecting said capacitors in parallel, terminal connections for a test piece, gap-means for controlling the connection of said terminal connections to said buses, and means connected across said buses for unidirectionally charging said capacitors, said charging means having the full capacitor-voltage of said buses, characterized by sufficient capacitors to give a maximum crest value of discharge, under optimum conditions, at least of the order of 50,000 amperes, and further characterized by a proportional arrangement whereby there is produced, under optimum conditions, a maximum duration of the discharge, to half value, at least of the order of 40 microseconds.

12. A lightning-stroke current generator comprising a plurality of capacitors, buses connecting said capacitors in parallel, terminal connections for a test piece, gap-means for controlling the connection of said terminal connections to said buses, and means connected across said buses for unidirectionally charging said capacitors, said charging means having the full capacitor-voltage of said buses, characterized by sufficient capacitors to give a maximum crest value of discharge, under optimum conditions, at least of the order of 50,000 amperes, and further characterized by a proportional arrangement whereby the effective inductance of said buses, gap-means and terminal connections is at least of the order of 4 microhenries.

13. A lightning-stroke current generator comprising a plurality of capacitors each having a rating at least of the order of 50,000 volts, buses connecting said capacitors in parallel, terminal connections for a test piece, gap-means for controlling the connection of said terminal connections to said buses, and means connected across said buses for unidirectionally charging said capacitors, said charging means having the full capacitor-voltage of said buses, characterized by a proportional arrangement whereby the effective inductance of said buses, gap-means and terminal connections is at least of the order of 4 microhenries.

14. A lightning-stroke current generator comprising a plurality of capacitors each having a rating at least of the order of 50,000 volts, buses connecting said capacitors in parallel, terminal connections for a test piece, gap-means for controlling the connection of said terminal connections to said buses, and means connected across said buses for unidirectionally charging said capacitors, said charging means having the full capacitor-voltage of said buses, characterized by a proportional arrangement whereby the effective inductance of said buses, gap-means and terminal connections, in microhenries, is at least of the order of one quarter of the effective capacitance of the capacitors, in microfarads.

15. A lightning-stroke current generator comprising a plurality of capacitors, buses connecting said capacitors in parallel, terminal connections for a test piece, a sound deadening box for containing the discharge of said test piece, a vent-pipe for said box, said vent-pipe having a plurality of opposed, spaced baffles therein, and gap-means for controlling the connection of said terminal connections to said buses.

16. A lightning-stroke current generator comprising a plurality of capacitors, buses connecting said capacitors in parallel, terminal connections for a test piece, and gap-means for controlling the connection of said terminal connections to said buses, characterized by means whereby said generator may be repeatedly used by an operator working in the same room with it, said means including means for enclosing the test-piece discharge-space, means for ventilating the test-piece discharge-space so as to tend to keep the air in approximately normal condition at said discharge and to carry away the noxious gases thereof, a sound deadening box for containing the discharge of said test piece, and a vent-pipe for said box, said vent-pipe having a plurality of opposed, spaced baffles therein, said ventilating means for the test piece including said sound-deadening box and said vent-pipe.

17. A combined lightning-stroke current and voltage generator comprising a lightning-stroke current generator comprising a plurality of capacitors, and buses connecting said capacitors in parallel, a lightning-stroke voltage generator comprising a plurality of serially connected capacitors, terminal connections for a test piece, coupling means including a gap-device for controlling the connection of said terminal connections to said lightning-stroke voltage generator, and other coupling means including an impedance-device for connecting said current-generator buses to said terminal connections, said impedance being sufficiently high to keep enough of the initial discharge of the voltage generator out of the current generator to cause an insulation-breakdown of the test piece.

18. A combined lightning-stroke current and voltage generator comprising a lightning-stroke current generator comprising a plurality of capacitors, and buses connecting said capacitors in parallel, a lightning-stroke voltage generator comprising a plurality of serially connected capacitors, terminal connections for a test piece, gap-means for controlling the connection of said terminal connections to said lightning-stroke voltage generator, and other gap-means and an impedance-device for connecting said current-generator buses to said terminal connections, said impedance-device being a high-resistance link fusible into a low-resistance arc, whereby it keeps enough of the discharge of the voltage generator out of the current generator long enough to cause an insulation-breakdown of the test piece and then changes into a relatively low-resistance discharge-path for connecting the current generator to the test piece.

PETER L. BELLASCHI.